United States Patent [19]

Lazarevich

[11] Patent Number: 4,848,088
[45] Date of Patent: Jul. 18, 1989

[54] HEAT RECYCLING PROCESS

[76] Inventor: Milan P. M. Lazarevich, 15 La Rose Avenue, Toronto, Ontario, Canada, M9P 1A7

[21] Appl. No.: 128,077
[22] Filed: Dec. 3, 1987
[51] Int. Cl.$^4$ ............................................. F01K 25/06
[52] U.S. Cl. .................................... 60/673; 165/104.12
[58] Field of Search ................................ 60/649, 673; 165/104.12

[56] References Cited

U.S. PATENT DOCUMENTS 4,183,218 1/1980 Eberly, Jr. ............................ 60/673
4,292,808 10/1981 Lohmiller ............................. 60/673

Primary Examiner—Allen M. Ostrager
Attorney, Agent, or Firm—Riches, McKenzie & Herbert

[57] ABSTRACT

The present invention relates to process and apparatus for regenerating low temperature, low pressure energy from the vaporization of a primary fluid having a high boiling point and a large latent heat of vaporization to high pressure, high temperature energy which can then either be fed back to that same primary fluid or put to other uses. The process comprises interacting the primary fluid with a heat recycling fluid consisting of a solution of two basic fluids, a solute and a solvent. The solvent has a low boiling point and a large latent heat of vaporization, while the solvent has a high boiling point. The solute and the solvent have a high affinity for one another. The heat recycling fluid takes up the latent heat of vaporization of the primary fluid to separate the solute from the solution and thereby produce an endothermic reaction. The solute is subsequently forced back into solution in the solvent in an exothermic reaction which liberates the latent heat of vaporization of the solute in the form of sensible heat energy usable for heating the recycling fluid. After being heated, the recycling fluid may be interacted with either the primary fluid or used as a heat source any other heat using process.

18 Claims, 3 Drawing Sheets

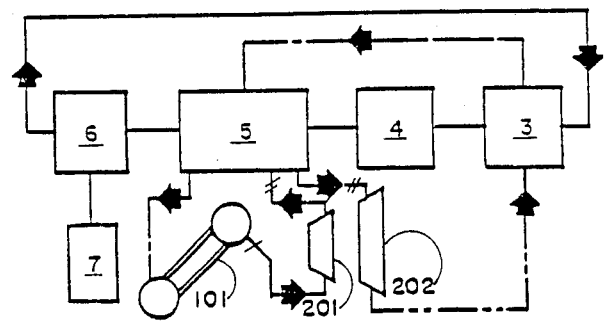
FIG.1.
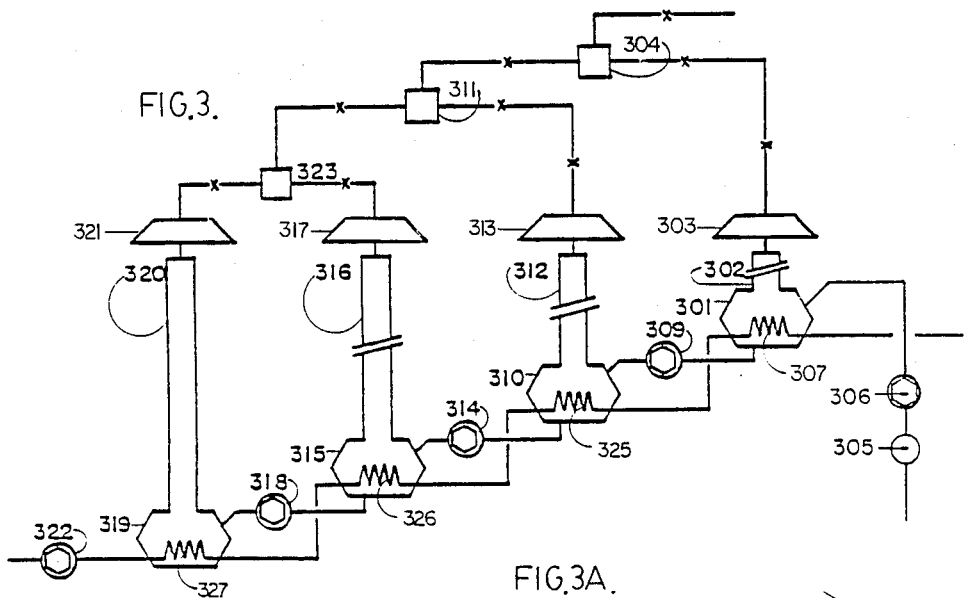
FIG.3.
FIG.3A.
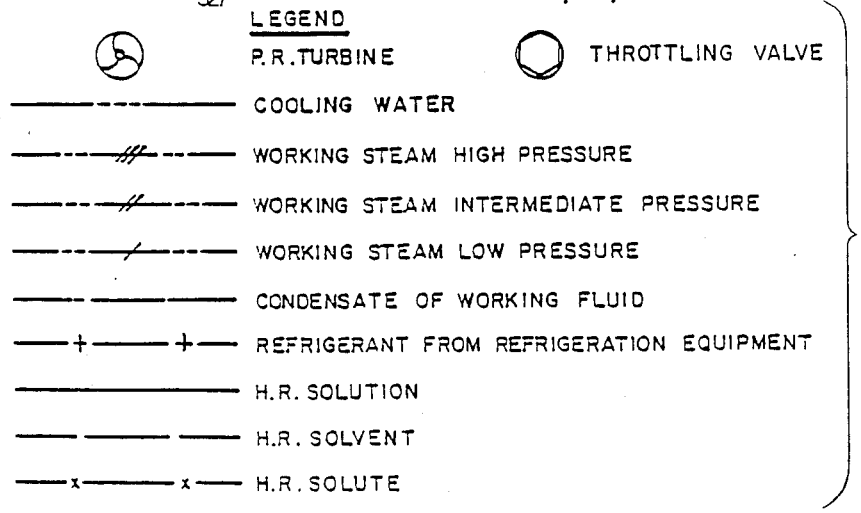
LEGEND
- ⊛ P.R.TURBINE
- ⬡ THROTTLING VALVE
- ——————— COOLING WATER
- ——///——— WORKING STEAM HIGH PRESSURE
- ——//——— WORKING STEAM INTERMEDIATE PRESSURE
- ——/——— WORKING STEAM LOW PRESSURE
- ——————— CONDENSATE OF WORKING FLUID
- —+——+— REFRIGERANT FROM REFRIGERATION EQUIPMENT
- ——————— H.R. SOLUTION
- ——— ——— H.R. SOLVENT
- —x——x— H.R. SOLUTE

HEAT RECYCLING PROCESS

FIELD OF THE INVENTION

The present invention relates to a process of interacting a primary fluid carrying heat as low temperature and/or low pressure energy, with a heat recycling fluid to regenerate this energy as high temperature, high pressure energy.

BACKGROUND OF THE INVENTION

Since the days of Denis Papin and James Watt, two major problems have been encountered in the conversion of thermal energy to mechanical work. Firstly, there have been problems in producing steam capable of doing maximum work in accordance with the quantity of energy imparted to the steam. Secondly, there have been problems in getting rid of the residual steam after the work has been done and reducing energy losses to a minimum level.

Solutions have been proposed for the first problem by the introduction of power plants in the form of the monstrous steam generators, steam engines and steam turbines as we know them today. However, there has been very little success in dealing with the second problem. Economical production of steam for driving steam engines, as well as other uses, is plagued with the fact that only about 30% of the latent heat of vaporization is retrieved back into the working fluid involved in the conversion of thermal energy into mechanical work. Even this is done at the expense of the capacity of the working fluid.

The following is a list of some U.S. patents generally relating to the present invention: 4,195,485: Binkerhoff 4,292,808: Lohmiller 4,333,313: Cardone et al. 4,519,441: Spevack 4,540,043: Mivra

SUMMARY OF THE INVENTION

The present invention is directed to a process which is capable of absorbing waste energy, be it low, medium or high level energy and converting it into useful energy, preferably fit for producing mechanical work. For example, the present invention permits the latent heat of vaporization of steam to be regenerated into energy capable of producing economically mechanical work.

More particularly, the process of the present invention is one which is used to regenerate low temperature, low pressure energy from the vaporization of a primary fluid having a high boiling point and a large latent heat of vaporization to high pressure, high temperature energy which can then either be fed back to that same primary fluid, or put to other uses. The process comprises interacting the primary fluid with a heat recycling fluid consisting of a solution of two basic fluids, a solute and a solvent. The solute has a low boiling point and a large latent heat of vaporization while the solvent has a high boiling point. The solute and the solvent have a high affinity for one another. The heat recycling fluid takes up the latent heat of vaporization of the primary fluid using it to at least partially separate the solute from solvent and thereby produce an endothermic reaction. The solute and the solvent are subsequently forced back into solution to further produce an exothermic reaction liberating the latent heat of vaporization of the solute which is now in the form of sensible heat energy and by being conserved within the solution, increases the enthalpy and, hence, the temperature of the solution. After being so heated, the heat recycling fluid may be interacted with the primary fluid to heat the primary fluid by heat exchange. Alternately, the heat from the heat recycling fluid may be exchanged in any other heat absorbing process.

In one of its aspects, the present invention provides a heat conversion process, using a primary fluid and a secondary heat recycling fluid wherein the primary fluid operating in either a liquid or gaseous state, transfers its latent heat of vaporization heat content to the heat recycling fluid, such energy being regenerated into high temperature sensible energy as heat content of the heat recycling fluid which is then used as heating medium for the primary or other heat utilizing fluids, said primary fluid having a high boiling point and a large latent heat of vaporization, said recycling fluid comprising a solution of a solvent and a solute having a high affinity for one another, the solute having a low boiling point and substantial latent heat of vaporization and the solvent having a high boiling point, said process comprising:

interacting the primary and heat recycling fluids whereby the latent heat of vaporization of said primary fluid is transferred to the heat recycling fluid causing the primary fluid to condense and the solute to evaporate from the heat recycling fluid thereby separating at least some of solute from the solvent converting the latent heat of vaporization of the primary fluid into latent heat of vaporization of the separated solute, subsequently forcing the separated solute back into solution liberating the latent heat of vaporization of the solute as free sensible energy which is maintained within said heat recycling solution to increase the enthalpy and temperature of the heat recycling fluid, and further utilizing the heated heat recycling fluid as a heat source for transfer of heat energy therefrom by heat exchange.

In another aspect, the present invention provides apparatus for separating a heat recycling fluid into constituents of liquid solvent and vapor consisting of gaseous solute and traces of water vapor by transfer of latent heat of vaporization of a primary fluid to latent heat of vaporization of the heat recycling fluid and then forcing the liquid solvent and vapor of the heat recycling fluid back into solution, thereby regenerating low energy of the heat recycling fluid to higher energy content, said apparatus comprising;

(a) a boiler-like shell tank receiving at one end the heat recycling fluid and discharging at the other end residual liquid of the heat recycling fluid;

(b) a coil-like indirect heat exchange means flooded in said tank with the heat recycling fluid, said coil-like indirect heat exchange means being fed at one end with steam of the primary fluid and discharging at the other end condensed liquid of the primary fluid which rejects its heat content to the heat recycling fluid and condenses;

(c) a column-like exhaust path for the vaporized heat recycling fluid where liquid water, if any, from the vaporized heat recycling fluid is separated from the vapor while the vapor is evacuated by a mechanical exhaust means and stored in a receiver;

(d) pump means which takes the residual liquid of the heat recycling fluid from the discharge end of the boiler-like shell tank and pushes it optionally through indirect heat exchange means for thermic treatment and discharges it at very high pressure into an ejector system;

(e) refrigerator, compressor, evaporator, and condenser means for optional thermic treatment of the constituents of the heat recycling fluid;

(f) a system of nozzles through which the heat recycling fluid at high pressure is discharged with the high pressure being converted into a high velocity jet stream;

(g) mixing chambers in which the constituents of the heat recycling fluid are mixed into solution;

(h) a system of diffusers through which the high velocity jet stream is converted back to lower grade static pressure than that discharged into said ejector system and at a high temperature;

(i) indirect heat exchange means where the heat content of the heat recycling fluid is transferred to heat utilizing fluids;

(j) heat recovery means to dispose of any residual and superfluous heat content of the heat recycling fluid and;

(k) power recovery means to liberate residual excess pressure picked up through the system of diffusers from the heat recycling fluid.

BRIEF DISCUSSION OF THE DRAWINGS

The above, as well as other advantages and features of the present invention will be described in greater detail according to the preferred embodiments of the present invention in which:

FIG. 1 is a schematic view of a regenerating system according to a preferred embodiment of the present invention;

Figure 5:
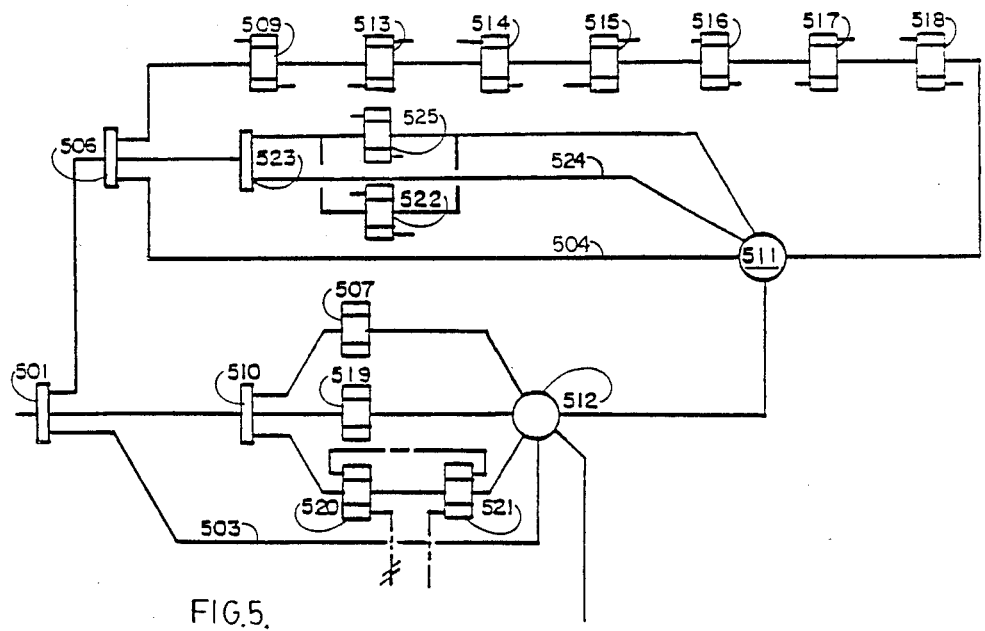
Figure 4:
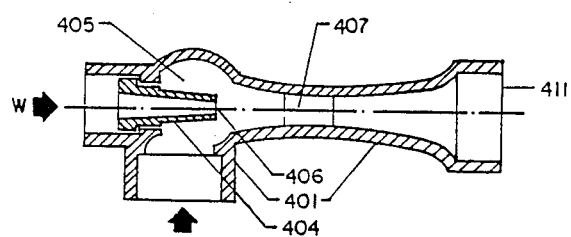

FIG. 3, appearing on the same page of the drawings as FIG. 1, is a schematic view showing a multiple fraction distillation system as well as collecting receivers for compressed gas according to a preferred embodiment of the system of the present invention;

FIG. 3a is a table comprising a LEGEND which sets out and defines various of the symbols used in FIGS. 1 to 3 and 5;

FIG. 4 is a sectional view through an ejector used in the system of FIG. 1 for forcing the solute and the solvent of the heat recycling fluid back into solution; and FIG. 5 is a schematic view showing heat exchangers used in the system of FIG. 1; and

DETAILED DESCRIPTION OF THE PREFERRED EMBODIMENTS

Figure 2:
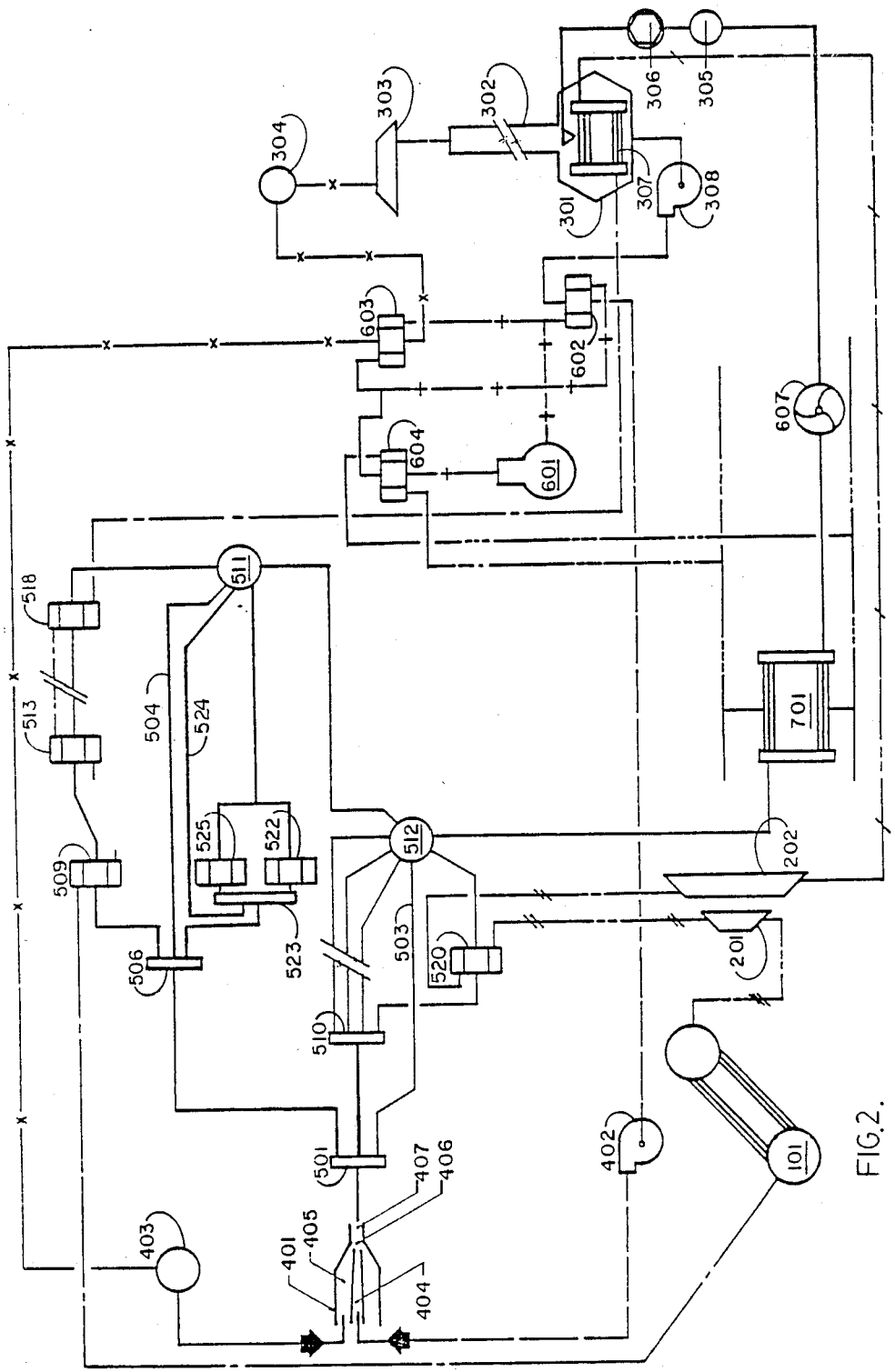
FIG. 2 is a flow chart for a process as carried out by the system of FIG. 1.

The present invention is directed to a heat recycling process in which two fluids are involved. One of those fluids is the working fluid, or the steam produced by steam generator 101 as shown in FIGS. 1 and 2. This steam may be produced by other means, such as by chemical or technological processes.

The recycling process occurs within the system as shown in FIG. 1. This system comprises an assembly 101, which is, for example, a steam source in the form of a high pressure steam generator; assemblies 201 and 202 which are users of the produced steam and, in this case, steam turbines; block 3 in which the latent heat of vaporization of the steam is transferred to the heat recycling fluid to separate at least some of the solute therefrom; block 4 in which the two separated constituents of the heat recycling fluid are forced back into solution; block 5 which consists of the heat exchangers in which the heat of the heat recycling fluid is transferred back to the primary fluid; block 6 consisting of a refrigeration system and power and heat recovery turbines and block 7 which contains temperature adjusting heat exchangers, ancillary equipment and the like.

In general terms, the steam, which is the primary fluid, after serving its purpose as intended, is generally a low temperature steam having low grade energy, is fed to a condenser, indicated by block 3 in FIG. 1, where it is condensed to water. After the primary water is run through the heat exchange systems in block 5 and has recaptured the heat content of the heat recycling fluid, it is fed where it may be used, for example, back to the original source, that is, the steam generator 101 to restart the working cycle.

The second fluid involved is the heat recycling fluid which consists of two basic constituents in the form of a solute and a solvent. The heat recycling fluid may additionally include additives which are of lesser importance than the solute and the solvent. Two particularly suitable constituents comprise a solute of anhydrous ammonia, $NH_3$, and a solvent comprising water, $H_2O$.

The heat recycling fluid is also fed to the condensing block 3 where it takes up the latent heat of vaporization from the working steam or heat from any other heat source which separates at least some of the solute from the remainder of the heat recycling fluid thereby condensing the steam. From here the now separated constituents of the heat recycling fluid, namely, a principally solute stream and the principally solvent stream, are optionally fed through a refrigerating system, comprising compressor 601, evaporators 602 and 603 and condensor 604 as shown in FIG. 2, so that the temperatures of the solute stream and the solvent stream may be adjusted to optimal values for operation of an ejector, which later compresses the solute and solvent back into solution, as indicated in block 4, and as best shown in FIG. 4 of the drawings.

As the ejector forces the solute and solvent back in solution, there is an exothermic reaction by which the latent heat of vaporization of the solute is liberated. However, the block 4 compressor system is thermally insulated and does not permit the liberated heat to dissipate. Accordingly, the temperature of the heat recycling solution is substantially increased. In addition, the ejector system itself is set up to pressurize the solution as required in order to prevent subsequent separation of the solute and the solvent at the increased temperature of the solution while retaining the liberated heat from the exothermic reaction.

Further details of the invention are described with reference to FIG. 2 showing a distillation system consisting of boiler 301 including a coil 307, a fractional distillation column 302, a compressor 303 for the evaporated heat recycling liquid and a receiver 304, all of which are housed in block 3. The steam, after being used for its intended purpose, e.g. as discharged from the steam turbine, is at a saturation temperature higher than the temperature of the heat recycling fluid during the early stages of the process and flows through the heating coil 307. The heat recycling fluid, on the other hand, is at a temperature lower than or not much greater than the temperature of the steam, while being stored in tank 305 at a pressure higher than the pressure in boiler 301. Through the heating control valve 306, the heat recycling fluid is fed to the boiler 301, flooding the heating coil 307. The pressure in the tank 305 is higher than the pressure in the boiler 301 so that some flashing occurs, to further reduce the temperature of the heat recycling fluid. Heat exchange between the steam and the heat recycling fluid is then induced whereby ammonia of heat recycling fluid evaporates. It is substantially only ammonia which evaporates with an almost insignificant amount of water vapour. The temperature of the remaining heat recycling fluid rises. The temperature differential between the heat absorbing heat recycling fluid and the heat rejecting steam decreases and when this differential drops to a predetermined value, considered to be the optimum value of the differential for that particular situation, the process is then interrupted.

The two constituents of the heat recycling fluid which have been separated with the evaporation of the ammonia, are once again dissolved with one another to reform the solution. Before again forcing the constituents into solution, each one is optionally fed to a refrigerating system consisting of compressor 601, evaporators 602 and 603 and condensor 604. The recycling fluid, that is, the residual water is fed by pump 308 through evaporator 602. The vapor, that is, the gaseous ammonia, having little additional water vapor, is evacuated through the distillation column 302, by compressor 303. Any water within the gaseous ammonia is discharged as liquid, through the column down to the boiler. The gaseous ammonia is then stored in receiver 304. If the condensation of the steam has not been completed, further systems may be added, as shown on FIG. 3 with all heating coils being in series with one another. Thence, if required, more groups in block 3 may be installed in series as shown in FIG. 3. That is, more boilers as 310, 315, 319. More coils as 325, 326, 327. More control valves as 309, 314, 318, 322. More columns as 312, 316, 320. More exhausters 313, 317, 321. More receivers as 311, 323. That is as many groups of block 3, as may be required.

From receiver 304, the gas is optionally fed through evaporator 603 of the refrigerating system in order to adjust the temperature of the gas to be fed to ejector 401. From here it is stored in receiver 403 for supply through a control valve, which is not shown, to ejector 401.

Referring more specifically to FIG. 4, the essential components of ejector 401 include a nozzle 404, a mixing chamber 405, and a diffuser 407. A pump 402, shown in FIG. 2, is used to force the water constituent of the heat recycling fluid through nozzle 404. Upstream of the nozzle the pressure of the water is high as required and passing through the nozzle the water stream gains velocity at the expense of its potential energy represented by this higher pressure upstream of the nozzle. At the end 406 of the nozzle, almost all the potential energy of the water has bee converted to kinetic energy, for example, increasing the velocity of the water jet in the mixing chamber 405, while the pressure is minimal. As required by capacity, the ejector system may be multinozzle and/or consist of more than one ejector units 401 in parallel.

Mixing chamber 405 is fed with the ammonia from receiver 403 in a continuous manner with the pressure of the gaseous ammonia being higher than the pressure of the water at this point. In the mixing chamber the two fluids, i.e. the ammonia and the water, intermix with one another at which point molecules from the ammonia are forced into the water. In addition, there are forces acting, due to the pressure differential between the fluids, the diffusion forces of the ammonia, the entrainment forces of the ejector and finally, and foremost, the affinity forces between the ammonia and the water. All of these forces result in the ammonia becomming fully dissolved in the water and this dissolving of the ammonia liberates substantial amounts of heat energy. However, the ejector system is thermally insulated as far as possible and the liberated heat is therefore maintained within the system increasing the sensible enthalpy of the heat recycling fluid, subsquently, the temperature of the heat recycling fluid increases. In order to prevent the separation of the solute and the solvent due to the increased temperatures attained, the ejector is appropriately sized so that the regained pressure at the end 411 of the diffuser is higher than the vapour pressure of the ammonia at the final temperature reached emerging from the ejector. Here the heat recycling fluid at its increased temperature, is ready to be fed to the heat exchangers of block 5.

Referring more particularly to FIG. 5, the heat exchanger system may consist of one or more heat exchange branches. Specifically shown in the drawings, an individual heat exchanger is represented including one central and two lateral sections and the fluid rejecting heat is shown as runing through the central section. The fluid absorbing heat is carried through the lateral or peripheral sections. The actual construction of the heat exchanger comprises materials resistant to any corrosive action of the fluid at elevated temperatures without presenting any catalytic properties.

In terms of the actual process shown in the drawings, the heat recycling solution is fed to a distributing header 501 and further down the line to the distributing headers for each of the groups of heat exchangers, e.g. 506 and 510. Each group of heat exchangers is completed with an equalizing or bypass line such as lines 503, 504 and 524, bypassing all of the units in the group and connecting the distributing header with the corresponding tank. Therefore, the distributing header 506 is connected to tank 511 by a bypass line 504, header 501 to tank 512 by bypass line 503 and the header 523 to tank 511 by bypass line 524 as shown in FIG. 2. The group of heat exchangers fed through header 510, reheats the steam as diverted from one stage to the next in a string of turbines, shown at 201 and 202 in FIG. 1. The heat exchangers 507, 519, 520 and 521 as shown in FIG. 5, illustrate a preferred arrangement of three steam reheating steps. The group fed through header 506 is used to preheat the boiler feed water and reheat the steam so the heat exchangers 522 and 525 reheat two more steps of steam reheating, while the heat exchangers 509, 513, 514, 515, 516, 517 and 518 heat the boiler feed water.

All heat exchangers common to one group discharge the heat recycling fluid into a tank also common to that group, such as tanks 511 and 512, however, the heat recycling fluid still has a certain heat content and it is directed to a standard surface condenser 701 to be cooled to the temperature as required by tank 305. The now-cooled heat recycling fluid, however, remains at a high pressure so that it is sent to a power recovery turbine 607 where its pressure is reduced to the level required for admission to tank 305.

Although various preferred embodiments of the present invention have been described herein in detail, it will be appreciated by those skilled in the art, that variations may be made thereto without departing from the spirit of the invention or the scope of the appended claims.

What I claim is:

1. A heat conversion process, using a primary fluid and a secondary heat recycling fluid wherein the primary fluid operating in either a liquid or gaseous state, transfers its latent heat of vaporization heat content to the heat recycling fluid, such energy being regenerated into high temperature sensible energy as heat content of the heat recycling fluid which is then used as heating medium for the primary or other heat utilizing fluids, said primary fluid having a high boiling point and a large latent heat of vaporization, said recycling fluid comprising a solution of a solvent and a solute having a high affinity for one another, the solute having a low boiling point and substantial latent heat of vaporization and the solvent having a high boiling point, said process comprising:

interacting the primary and heat recycling fluids whereby the latent heat of vaporization of said primary fluid is transferred to the heat recycling fluid causing the primary fluid to condense and the solute to evaporate from the heat recycling fluid thereby separating at least some of solute from the solvent converting the latent heat of vaporization of the primary fluid into latent heat of vaporization of the separated solute, subsequently forcing the separated solute back into solution liberating the latent heat of vaporization of the solute as free sensible energy which is maintained within said heat recycling solution to increase the enthalpy and temperature of the heat recycling fluid, and further utilizing the heated heat recycling fluid as a heat source for transfer of heat energy therefrom by heat exchange.

2. A process as claimed in claim 1, wherein said heated recycling fluid is utilized as a heat source for transfer of heat energy to said primary fluid.

3. A process as claimed in claim 1, wherein the primary fluid is water in either liquid or a gaseous state at a temperature differrent from the temperature of the recycling fluid.

4. A process as claimed in claim 1, wherein the heat recycling fluid is a solution of ammonia (NH₃) in water.

5. A process as claimed in claim 1, wherein the primary fluid includes steam which condenses when subjected to the cooling action of the heat recycling fluid, the temperature of the heat recycling fluid is lower than the temperature of the primary fluid, and both fluids are acting through indirect contact heat exchange means.

6. A process as claimed in claim 4, wherein the heat recycling fluid, subjected to heating by the primary fluid, evaporates in an endothermic reaction, evaporation consisting mostly of solute, leaving the heat recycling fluid a weak solution of ammonia.

7. A process as claimed in claim 6, wherein the vapor of the heat recycling fluid is carried away as soon as produced by an exhauster through a column-like means in which liquid water, if any, is separated from the vapor and rejected back into the liquid heat recycling fluid.

8. A process as claimed in claim 6, wherein the vapour of the heat recycling fluid and the remaining liquid part of the heat recycling fluid are cooled by refrigeration or heat exchange with other coolants.

9. A process as claimed in claim 6, wherein the liquid part of the heat recycling fluid is brought to a high pressure.

10. A process as claimed in claim 9, wherein the high pressure of the liquid part of the heat recycling fluid is utilized to convert the liquid part into a high velocity liquid jet during the step of forcing the separated solute back into solution.

11. A process as claimed in claim 6, wherein the separated solute and the liquid part of the heat recycling fluid are mixed again in an exothermic reaction.

12. A process as claimed in claim 11, where the heat evolved in the exothermic reaction is prevented from dissipating by insulation, thus increasing the enthalpy and subsequently the temperature of the heat recycling fluid.

13. A process as claimed in claim 10, wherein kinetic energy of the high velocity liquid jet subsequently increases the static pressure of the heat recycling fluid sufficiently to prevent re-evaporation of the solute from the heat recycling fluid at the increased temperature of the heat recycling liquid after the separated solute has been forced back into solution.

14. A process as claimed in claim 13, wherein due to the increased enthalpy, the heat recycling fluid is brought to a temperature high enough to be used in various technological or other processes.

15. A process as claimed in claim 1, wherein through an indirect contact heat exchange the heat recycling fluid rejects its heat content to the primary fluid or various heat utilizing fluids.

16. A process as claimed in claim 1, wherein the residual heat of the heat recycling fluid after its use as a heat source is recovered by heat recovering means or rejected through conventional coolers.

17. A process as claimed in claim 1, wherein the residual pressure of the heat recycling fluid, after a full cycle of the process has been completed, is reduced through energy recovering means.

18. Apparatus for separating a heat recycling fluid into constituents of liquid solvent and vapor consisting of gaseous solute and traces of water vapor by transfer of latent heat of vaporization of a primary fluid to latent heat of vaporization of the heat recycling fluid and then forcing the liquid solvent and vapor of the heat recycling fluid back into solution, thereby regenerating low energy of the heat recycling fluid to higher energy content, said apparatus comprising;

(a) a boiler-like shell tank receiving at one end the heat recycling fluid and discharging at the other end residual liquid of the heat recycling fluid;

(b) a coil-like indirect heat exchange means flooded in said tank with the heat recycling fluid, said coil-like indirect heat exchange means being fed at one end with steam of the primary fluid and discharging at the other end condensed liquid of the primary fluid which rejects its heat content to the heat recycling fluid and condenses;

(c) a column-like exhaust path for the vaporized heat recycling fluid where liquid water, if any, from the vaporized heat recycling fluid is separated from the vapor while the vapor is evacuated by a mechanical exhaust means and stored in a receiver;

(d) pump means which takes the residual liquid of the heat recycling fluid from the discharge end of the boiler-like shell tank and pushes it optionally through indirect heat exchange means for thermic treatment and discharges it at very high pressure into an ejector system;

(e) refrigerator, compressor, evaporator, and condenser means for optional thermic treatment of the constituents of the heat recycling fluid;
(f) a system of nozzles through which the heat recycling fluid at high pressure is discharged with the high pressure being converted into a high velocity jet stream;
(g) mixing chambers in which the constituents of the heat recycling fluid are mixed into solution;
(h) a system of diffusers through which the high velocity jet stream is converted back to lower grade static pressure than that discharged into said ejector system and at a high temperature;
(i) indirect heat exchange means where the heat content of the heat recycling fluid is transferred to heat utilizing fluids;
(j) heat recovery means to dispose of any residual and superfluous heat content of the heat recycling fluid and;
(k) power recovery means to liberate residual excess pressure picked up through the system of diffusers from the heat recycling fluid.

* * * * *